United States Patent
Coates et al.

(10) Patent No.: US 7,578,359 B2
(45) Date of Patent: Aug. 25, 2009

(54) DOWNHOLE ACOUSTIC SOURCE

(75) Inventors: Richard Coates, Middlebury, CT (US);
Chung Chang, Lexington, MA (US);
Iain Cooper, Sugarland, TX (US);
Marcel Boucher, Houston, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 216 days.

(21) Appl. No.: 11/615,526

(22) Filed: Dec. 22, 2006

(65) Prior Publication Data

US 2008/0149416 A1 Jun. 26, 2008

(51) Int. Cl.
*E21B 47/14* (2006.01)

(52) U.S. Cl. .................. 175/40; 175/50; 166/177.1; 181/106; 181/113

(58) Field of Classification Search .................. 175/40, 175/50; 166/177.1; 181/104, 106, 113; 367/25, 367/31, 912; 324/333–343
See application file for complete search history.

(56) References Cited

U.S. PATENT DOCUMENTS

| | | | |
|---|---|---|---|
| 4,383,591 A * | 5/1983 | Ogura | 181/106 |
| 6,782,970 B2 | 8/2004 | Chang | |
| 2003/0205428 A1 | 11/2003 | Chang | |

OTHER PUBLICATIONS

Chang et al Localized maps of the subsurface Schlumberger Oilfield Review, Spring 1998.

* cited by examiner

*Primary Examiner*—Jennifer H Gay
*Assistant Examiner*—Sean D Andrish
(74) *Attorney, Agent, or Firm*—Edward Bushard; James McAleenan

(57) ABSTRACT

An acoustic source for delivering acoustic energy to a ground formation, particularly a rock formation, the source including (a) a solenoid to generate an electromagnetic field, (b) a bullet positioned within the influence of the electromagnetic field, (c) a casing surrounding and enclosing the solenoid and bullet so that both the solenoid and the bullet are protected from the surrounding environment, in use the solenoid being electrically energized to cause the bullet to be propelled by electromagnetic force so that the bullet impacts an anvil portion of the casing in contact with the ground formation is provided.

1 Claim, 2 Drawing Sheets

DOWNHOLE ACOUSTIC SOURCE

BACKGROUND

This invention relates to an acoustic source for sensing the properties of a ground formation, particularly a rock formation during drilling or other operation within a wellbore.

The co-owned United States Patent Application Publication No. US 2003/0205428 A1, the disclosure of which is incorporated herein by reference, describes an acoustic source using a solenoid which is energized by an electric current pulse to cause a metal hammer to be propelled, by electromagnetic force, towards a bore hole wall. Such an electromagnetically actuated hammer is known to be an extremely effective acoustic source when the hammer is fired against a rock formation or against a metal plate (serving as an anvil) placed in firm contact with the rock formation.

In use, the acoustic source is mounted on drilling apparatus (e.g. the bottom hole assembly of a drill string pipe, drill-collar or drill bit) and a major problem is protecting the components of the acoustic source, notably the moveable hammer, from the surrounding environment (which contains drilling mud and cuttings) and from wear on the hammer resulting from the rotational movement of the bottom hole assembly, collar or bit. The invention aims to provide an acoustic source which overcomes this problem.

SUMMARY OF THE INVENTION

According to the invention there is provided an acoustic source for delivering acoustic energy to a ground formation, particularly a rock formation, the source comprising:
  a. a solenoid to generate an electromagnetic field,
  b. a hammer positioned within the influence of the electromagnetic field, and
  c. a housing surrounding and enclosing the solenoid and the hammer, the housing being movably integrated into a wall of a wellbore conveyance tool so that both the solenoid and the hammer are protected from the surrounding environment.

In use, the solenoid is being electrically energized to cause the hammer to be propelled by electromagnetic force so that the hammer impacts an anvil portion of the housing, whilst the housing is maintained in contact with the subterranean formation. Thus, by recourse to the invention the solenoid and hammer are enclosed and protected by the housing and thereby protected from exposure to the harsh environment of the subterranean operation. Such operation can be a drill string operation, a coiled tubing operation, a logging operations, including drilling, remedial or stimulation operation. The conveyance tool can hence be a drill string, a coiled tubing string or a wireline cable.

Preferably, the housing, together with the solenoid and hammer, is mounted in an opening in a wall of a drilling apparatus for drilling a bore through the ground. The wall may be the wall of a bottom hole assembly (BHA) or a drill-collar. The housing, together with the solenoid and hammer, is conveniently mounted in the opening for limited movement in a perpendicular direction with respect to the cylindrical wall, so that internal fluid pressure within the cylindrical wall urges the anvil portion of the housing into contact with the subterranean formation. The internal fluid pressure may be provided by a pressurized hydraulic reservoir or by fluid circulating through the conveyance tool, e.g. by the drilling fluid during drilling operations.

The housing is preferably captive in the wall, this conveniently being achieved by the wall having an inwardly projecting shoulder and the housing having an outwardly projecting shoulder, a spring being positioned between and attached to the shoulders so as to limit radial movement of the housing with respect to the wall and to provide acoustic isolation of the housing with respect to the wall. The spring can be replaced by other elements which exert a weak restoring force so as to retract the housing to lie preferably flush with the surrounding surface when the force that pushes the housing against the formation is switched off.

As an alternative to the acoustic source being mounted in the wall of a bottom hole assembly or drill-collar, the source may be mounted in a fixed cutter bit of drilling apparatus, and in this case a part of the housing may project through a cutting face of the fixed cutter bit, with said part preferably being an elongated protrusion of the housing aligned with the anvil portion of the housing. In this case the solenoid may be electrically energized by a mud turbine located within the BHA or other section of the drill string.

Aspects and embodiments of the present invention will now be illustrated, by way of example, with reference to the accompanying figures. In the following further aspects and embodiments of the present invention will become apparent to those skilled in the art.

BRIEF DESCRIPTION OF THE DRAWINGS

The present disclosure is described in conjunction with the appended figures.

DETAILED DESCRIPTION AND EXAMPLES

Figure 1A:
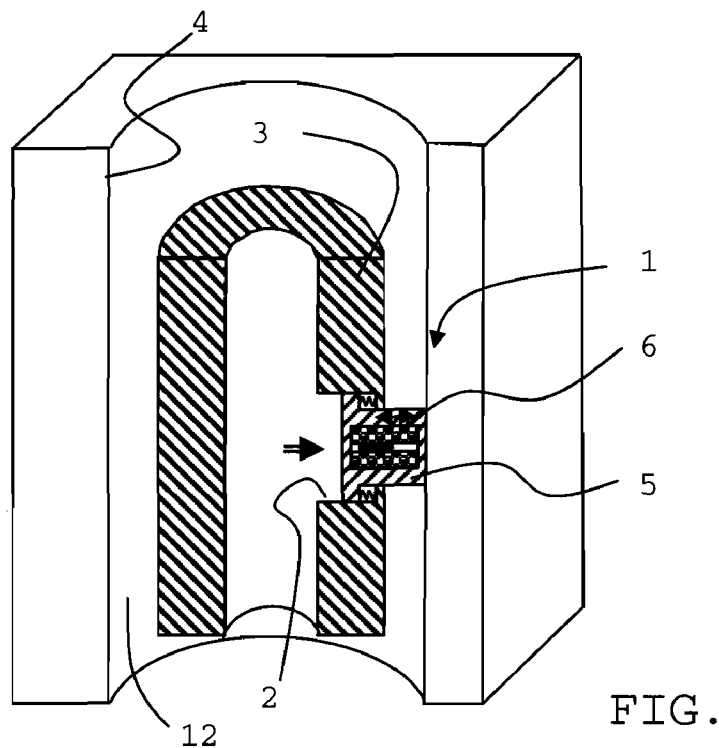
FIG. 1A is a fragmentary sectional view, with a portion (FIG. 1B) shown to an enlarged scale, of a first embodiment.
Figure 1B:
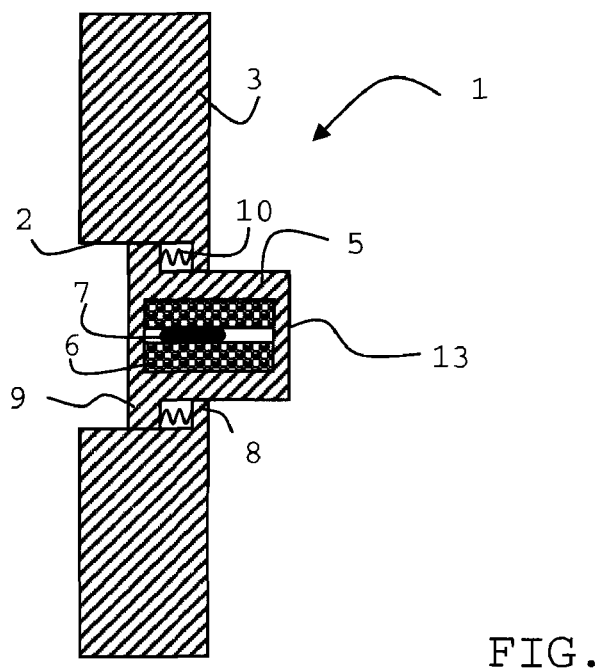

In the first embodiment of FIGS. 1A and 1B, the acoustic source 1 is shown fitted in a circular opening 2 in the cylindrical wall 3 of a bottom hole assembly or drill-collar positioned in a wellbore 4 being drilled in a rock formation. Instead of being circular, the opening 2 could be square or rectangular but in any case the opening 2 is dimensioned so as not to weaken the wall 3. The acoustic source 1 comprises a metal housing 5 which completely encloses a cylindrical solenoid coil 6 within the core of which is located a metal hammer 7 guided for sliding movement within the cylindrical bore defined by the solenoid coil 6.

The assembly of housing 5, solenoid coil 6 and hammer 7 is captive within the opening 2 but is capable of limited radial movement (e.g. of the order of 2 or 3 inches) as a consequence of the wall 3 having an inwardly projecting shoulder 8, the housing 5 having an outwardly projecting shoulder 9 and the space between these shoulders being occupied by an annular bellows-like spring 10 (or alternatively by a series of circumferentially spaced individual springs). Radially outward movement of the assembly of the housing 5, solenoid coil 6 and hammer 7 is limited by the interengagement of the shoulders 8 and 9 and radially inward movement of this assembly is limited as a consequence of the two ends of the spring being connected to the shoulders 8 and 9 respectively. Another shoulder (not shown) may serve as end stops to prevent the housing from protruding into the inner bore of the drill string and BHA 3.

When the drill string is in use, drilling fluid is pumped under pressure down the inner bore of the drill string to cool and lubricate the drill bit. The drilling fluid returns as a slurry with cuttings from the formation to the surface through the annular space 12 between the drill string wall 3 and the wellbore 4. Under normal operating conditions, fluid pressure in the internal passage of the drill string is higher than the fluid pressure in the annular space 12, and this pressure difference urges the housing 5 radially outwardly to cause the anvil portion 13 of the housing 5 to be maintained in engagement with the bore 4, despite rotation of the drill string. The bellow spring 10 provides a restoring force to push the housing back into its standard position such that the anvil surface 13 is flush with the surrounding surface of the BHA 3.

The solenoid coil 6 is energized by an electrical pulse which causes the hammer 7 to be accelerated into the core of the solenoid coil. The pulse duration is such that the solenoid is de-energized when the hammer reaches the mid point of the solenoid, otherwise the electromagnetic forces would decelerate the hammer. The hammer 7 continues its travel until it impacts the internal surface of the anvil portion 13 of the housing, the external surface of the anvil portion 13 abutting the drilled wellbore 4 so that the impact of the hammer 7 is transmitted into the formation, thus leading to an effective generation of sonic energy. The sonic energy can then be reflected from features of the formation using suitable receivers either placed on the drill string, in other subterranean locations such as completions or on the surface. Such receiver are well known in the industry and hence not the primary subject of the present invention.

The casing 5 will encase all the elements described in the aforementioned US Patent Publication 2003/0205428, namely, the solenoid 6, any magnetic shielding material intended to increase the field strength of the moving hammer 7 and any retraction assembly (not shown). The metal block forming the face of the housing whose external face is in contact with the borehole wall will act as an anvil. It may be desirable to make this face of a material designed to either (a) minimize the acoustic impedance contrast between it and the formation or (b) decelerate the hammer in such a way to give a specified force and spectrum or some optimised combination of the two. In addition, the housing may be designed such that this anvil may be easily removed and replaced in the field so as to allow different anvils to be used to optimise performance in a given well or bit-run. The outer and inner faces of the housing are preferably formed of or covered by hardened material using for example the same coating as applied to the pads in rotary steerable drilling systems such as Schlumberger's Powerdrive™ system. Such material can be selected from hardened steel, tungsten carbide, polydiamond coated surface and other known materials.

Figure 2A:
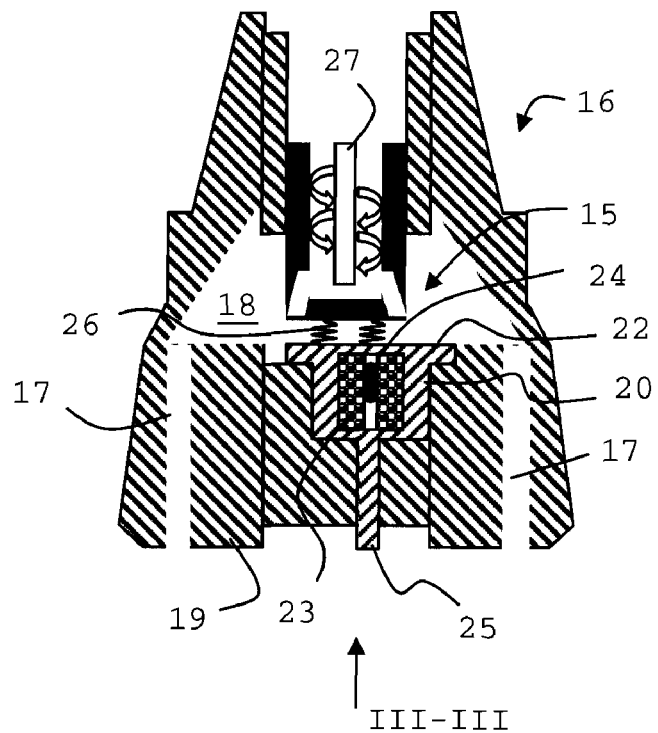
FIG. 2A is a fragmentary sectional view of a second embodiment.
Figure 2B:
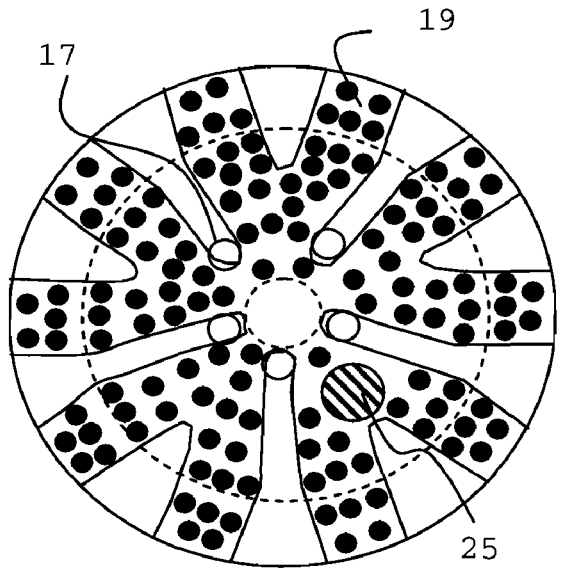
FIG. 2B is an end view of the second embodiment, looking in the direction of the arrow III-III of FIG. 2A.

In the second embodiment of FIGS. 2A and 2B, the acoustic source 15 is shown fitted in the end of a fixed cutter bit 16 having mud flow nozzles 17 leading from a central chamber 18 of the bit to the leading cutting face 19. A central block of the bit has a cylindrical recess 20 which receives the acoustic source 15. As before, the source 15 has a metal housing 22 which encloses a solenoid coil 23 within the core of which is located a metal hammer 24 guided for sliding movement within the bore defined by the solenoid core. The housing 22 has an integrally formed elongated protrusion 25 which extends through a bore in the bit, this protrusion terminating in an end which is slightly proud of the surrounding surface of the leading face 19 of the bit. The housing 22 is biased in a direction urging the end of the protrusion 25 into contact with the end of the hole being drilled, this bias being provided partially by the internal fluid pressure in the chamber 18 of the bit and partially by a spring 26 engaging the adjacent surface of the housing 22.

In the example a small mud turbine 27, driven by the passage of mud slurry through the internal bore of the bit 16, provides the electrical power for a current pulse which energizes the solenoid coil 23 to cause the hammer 24 to engage the inner end of the protrusion 25 which in this case serves as the anvil portion of the housing 22. The extremity of the protrusion 25 is urged against the face of the bore being cut to establish a good acoustic contact therewith.

The protrusion 25 is displaced from the rotational axis of the bit to ensure that the protrusion 25 does not prevent rock being cut at the centre of the bit. It will be noted that the protrusion 25 need be no larger in diameter than one of the mud flow nozzles 17.

The housing 22 completely surrounds and encloses the solenoid coil 23 and the hammer 24, so that the latter are protected, in a manner comparable to that described for FIG. 1. FIG. 2 shows the housing having an external shoulder located in a counterbore of the recess 20 but in practice the recess in the bit and the housing can be of any complementary shape, including square or rectangular.

In both embodiments, the electrical wiring for energising the solenoid passes into the housing through a narrow bore or passage within which the wiring is sealed by a sealing compound.

The invention has potential applications in sonic imaging, sonic logging, crosswell seismics and permanent monitoring. It can be operated during drilling, fracturing or other well bore operations where a conveyance tool is either lowered into or lifted from a wellbore.

In particular, sonic imaging conducted while drilling promises to provide the basis for a deep reading sonic imaging or sonar tool that can be used in combination with other geo-steering equipment and methods. However, in order to realize this potential the problem of mounting the bullet or hammer on a drill-collar or drill string in a robust and reliable fashion in such a way that it is in good acoustic contact with the formation must be resolved. The criteria for a successful solution to this problem are:

- the bullet or hammer must make direct contact with the formation or indirect contact via an intermediate structure in good acoustic contact with the formation.
- the central moving hammer must not exit the tool completely and must be retrieved and repositioned correctly after each firing.
- the hammer and associated retrieval device must be prevented from becoming embedded or significantly sticking in the formation during operation.
- the hammer and associated retrieval device must operate in a reliable and robust manner in the presence of drilling mud and cuttings.

the mounting must not compromise the drill string or drill collar nor must it impede drilling operations.

The invention enables these criteria to be satisfied in a simple, robust construction.

While the invention has been described in conjunction with the exemplary embodiments described above, many equivalent modifications and variations will be apparent to those skilled in the art when given this disclosure together with the documents mentioned herein, which are all incorporated herewith by reference. Accordingly, the exemplary embodiments of the invention set forth above are considered to be illustrative and not limiting. Various changes to the described embodiments may be made without departing from the spirit and scope of the invention

What is claimed is:

1. An acoustic source for delivering acoustic energy to a subterranean formation, the source comprising:
   (a) a solenoid to generate an electromagnetic field,
   (b) a hammer positioned within the influence of the electromagnetic field, and
   (c) a movable housing surrounding and enclosing the solenoid and the hammer, the movable housing having a part designed to engage with a surface of the subterranean formation, wherein:
   the housing, together with the solenoid and the hammer, is mounted in an opening in a wall of one of a bottom hole assembly, a drill collar of a drill string and a wellbore conveyance tool; and
   the wall has an inwardly projecting shoulder and the housing has an outwardly projecting shoulder, a spring being positioned between and attached to the shoulders so as to limit radial movement of the housing with respect to the wall and to provide acoustic isolation of the housing with respect to the wall.

* * * * *